United States Patent
Lee et al.

(10) Patent No.: US 7,695,243 B2
(45) Date of Patent: Apr. 13, 2010

(54) DUST HOLE DOME BLADE

(75) Inventors: Ching-Pang Lee, Cincinnati, OH (US);
Tingfan Pang, West Chester, OH (US);
Brian Alan Norton, Cincinnati, OH (US); Jan Christopher Schilling, Middletown, OH (US); Aspi Rustom Wadia, Loveland, OH (US)

(73) Assignee: General Electric Company, Schenectady, NY (US)

( * ) Notice: Subject to any disclaimer, the term of this patent is extended or adjusted under 35 U.S.C. 154(b) by 708 days.

(21) Appl. No.: 11/494,378

(22) Filed: Jul. 27, 2006

(65) Prior Publication Data
US 2009/0155088 A1 Jun. 18, 2009

(51) Int. Cl.
*F01D 5/08* (2006.01)
*F03B 11/08* (2006.01)

(52) U.S. Cl. .................. 415/121.1; 415/115; 416/97 R (58) Field of Classification Search ................ 415/115, 415/121.1, 121.2, 121.3, 169.1; 416/92, 416/96 R, 97 A, 97 R
See application file for complete search history.

(56) References Cited

U.S. PATENT DOCUMENTS

| | | | | |
|---|---|---|---|---|
| 4,073,599 A | | 2/1978 | Allen et al. | |
| 4,761,116 A | * | 8/1988 | Braddy et al. | 416/92 |
| 4,820,122 A | | 4/1989 | Hall et al. | |
| 4,940,388 A | * | 7/1990 | Lilleker et al. | 416/97 R |
| 4,992,026 A | | 2/1991 | Ohtomo et al. | |
| 5,125,798 A | | 6/1992 | Muth et al. | |
| 5,232,343 A | * | 8/1993 | Butts | 416/97 R |
| 5,387,085 A | * | 2/1995 | Thomas et al. | 416/97 R |
| 5,395,212 A | | 3/1995 | Anzai et al. | |
| 5,403,159 A | | 4/1995 | Green et al. | |
| 5,462,405 A | | 10/1995 | Hoff et al. | |
| 5,538,394 A | * | 7/1996 | Inomata et al. | 416/97 R |
| 5,564,902 A | | 10/1996 | Tomita | |
| 5,660,523 A | | 8/1997 | Lee | |
| 5,902,093 A | | 5/1999 | Liotta et al. | |
| 5,967,752 A | * | 10/1999 | Lee et al. | 416/97 R |
| 5,971,708 A | * | 10/1999 | Lee | 416/97 R |
| 6,089,826 A | | 7/2000 | Tomita et al. | |
| 6,164,914 A | | 12/2000 | Correia et al. | |
| 6,491,496 B2 | | 12/2002 | Starkweather | |
| 6,527,514 B2 | | 3/2003 | Roeloffs | |
| 6,609,884 B2 | | 8/2003 | Harvey | |
| 6,672,829 B1 | | 1/2004 | Cherry et al. | |
| 6,874,992 B2 | | 4/2005 | Dailey | |
| 6,971,851 B2 | * | 12/2005 | Liang | 416/1 |
| 7,097,419 B2 | * | 8/2006 | Lee et al. | 415/115 |
| 7,137,779 B2 | * | 11/2006 | Liang | 416/1 |
| 7,442,008 B2 | * | 10/2008 | Kopmels et al. | 416/97 R |
| 2006/0062671 A1 | | 3/2006 | Lee et al. | |

OTHER PUBLICATIONS

U.S. Appl. No. 11/243,378, filed Oct. 4, 2005, inventor: C-P Lee et al.
GE Aviation, "Turbine Blade," in public use in USA more than one year before May 1, 2006, 5 pages.

* cited by examiner

*Primary Examiner*—Igor Kershteyn
(74) *Attorney, Agent, or Firm*—William S. Andes; Francis L. Conte (57) ABSTRACT

A hollow turbine airfoil includes a tip cap bounding an internal cooling circuit between opposite pressure and suction sidewalls. The tip cap includes an internal dome surrounding a dust hole, and the dome is inclined inwardly toward the airfoil root both transversely between the opposite sidewalls and chordally between opposite leading and trailing edges of the airfoil.

33 Claims, 6 Drawing Sheets

DUST HOLE DOME BLADE

BACKGROUND OF THE INVENTION

The present invention relates generally to gas turbine engines, and, more specifically, to turbine blades therein.

In a gas turbine engine, air is pressurized in a compressor and mixed with fuel in a combustor for generating hot combustion gases from which energy is extracted in turbine stages disposed downstream therefrom. A high pressure turbine (HPT) powers the compressor through one drive shaft, and a low pressure turbine (LPT) powers an upstream fan in a turbofan engine application, or powers an external drive shaft for marine and industrial applications.

Each turbine stage includes a turbine nozzle in which a row of stator vanes direct the hot combustion gases downstream through a row of turbine rotor blades mounted to the perimeter of a supporting rotor disk to power the drive shaft. The turbine blades include airfoils extending in radial span from root to tip and axially between opposite leading and trailing edges.

Each airfoil has a generally concave pressure sidewall and a circumferentially opposite, generally convex suction sidewall spaced transversely apart to define an internal cooling circuit. The cooling circuit typically includes several radial channels or passages separated by longitudinal partitions or ribs.

The cooling circuit is fed with pressurized air bled from the compressor which is channeled through inlets in the supporting dovetail of each blade to carry the cooling air radially outwardly through the airfoil during operation.

The individual cooling passages in the airfoil terminate at the radially outer tip cap of the airfoil, which typically includes outlet holes therein for discharging a portion of the internal cooling air. The airfoil typically includes various rows of film cooling holes through the pressure and suction sidewalls, as well as a row of trailing edge outlets or slots which collectively discharge the spent cooling air from the airfoil and provide thermal protection thereof.

The internal cooling circuit may have various configurations for differently cooling the different portions of the airfoil between the leading and trailing edges and along the opposite pressure and suction sidewalls. Dedicated cooling passages may be located along the leading edge and along the trailing edge, with different cooling passages located axially therebetween.

For example, the turbine airfoil commonly includes one or more serpentine cooling circuits having an outbound inlet passage extending to the airfoil tip which then changes direction in a flow bend into a radially inbound flow passage extending to the airfoil root, which yet again changes direction in another flow bend into another radially outbound flow passage in a three-pass serpentine circuit.

The modern turbine blade is typically manufactured by casting which requires a ceramic core to define the intricate features of the internal cooling circuit inside the blade. The casting process and configuration of the several radial passages inside the airfoil typically result in substantially flat or horizontal inner surfaces of the tip cap above each of the flow passages.

As indicated above, the tip cap may include small outlet holes for discharging a portion of the spent internal cooling air out the airfoil tip during operation in conjunction with discharge of the air through many rows of film cooling holes.

However, the cooling air may include small particles of dust in various quantities depending upon the specific environment in which the engine is operated. For example, a turbofan aircraft engine may be used power an aircraft in flight through various locations in the world, some of which are prone to significant atmospheric dust especially around landing fields.

Accumulation of dust inside the small passages and holes of a turbine blade is a well known problem which is typically ameliorated by introducing relatively large dust holes in the tip cap of the turbine blades. The size of the dust holes is typically about twice the size of the common film cooling holes found in the airfoil sidewalls, and correspondingly increases the flow discharge therefrom, but with the significant attribute of carrying therewith and discharging from the turbine airfoil significant quantities of the entrained dust.

Accordingly, a compromise is made in the tip cap region to locally increase the flow discharge at relatively few dust holes for the benefit of reducing dust accumulation inside the airfoil.

However, experience has shown in one turbine blade used publicly in commercial use throughout the world for many years that despite the use of such dust holes in the blade tip cap, dust may still accumulate under the tip cap and eventually block discharge flow through the dust holes leading to a shorter life for the turbine blades.

Experience and actual observations of turbine blades used in service show dust accumulation at the radially outer end of the internal flow passages, including both serpentine and non-serpentine flow passages. It appears that the initially fine dust particles entrained in the cooling air accumulate or aggregate together during operation to form larger particles or chunks.

Centrifugal force drives these particles and chunks radially outwardly during operation, which are then trapped by the inner surface of the tip cap. The particles and chunks may then bond to the inner surface of the tip cap.

Or, some of the chunks may remain loose and upon shutdown of the engine these loose chunks may then drop toward the roots of some of the blades until the engine is next again started, in which case the chunks are again driven radially outwardly and may fully block the relatively large dust holes themselves. Upon blocking of an individual dust hole, the dust particles entrained in the cooling air may then accumulate below the tip cap and further increase the flow blockage and eventually completely block cooling flow in an individual flow passage.

Accordingly, it is desired to provide a turbine blade having an improved dust extraction configuration for increasing the useful life of the blade in dust environments.

BRIEF DESCRIPTION OF THE INVENTION

A hollow turbine airfoil includes a tip cap bounding an internal cooling circuit between opposite pressure and suction sidewalls. The tip cap includes an internal dome surrounding a dust hole, and the dome is inclined inwardly toward the airfoil root both transversely between the opposite sidewalls and chordally between opposite leading and trailing edges of the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
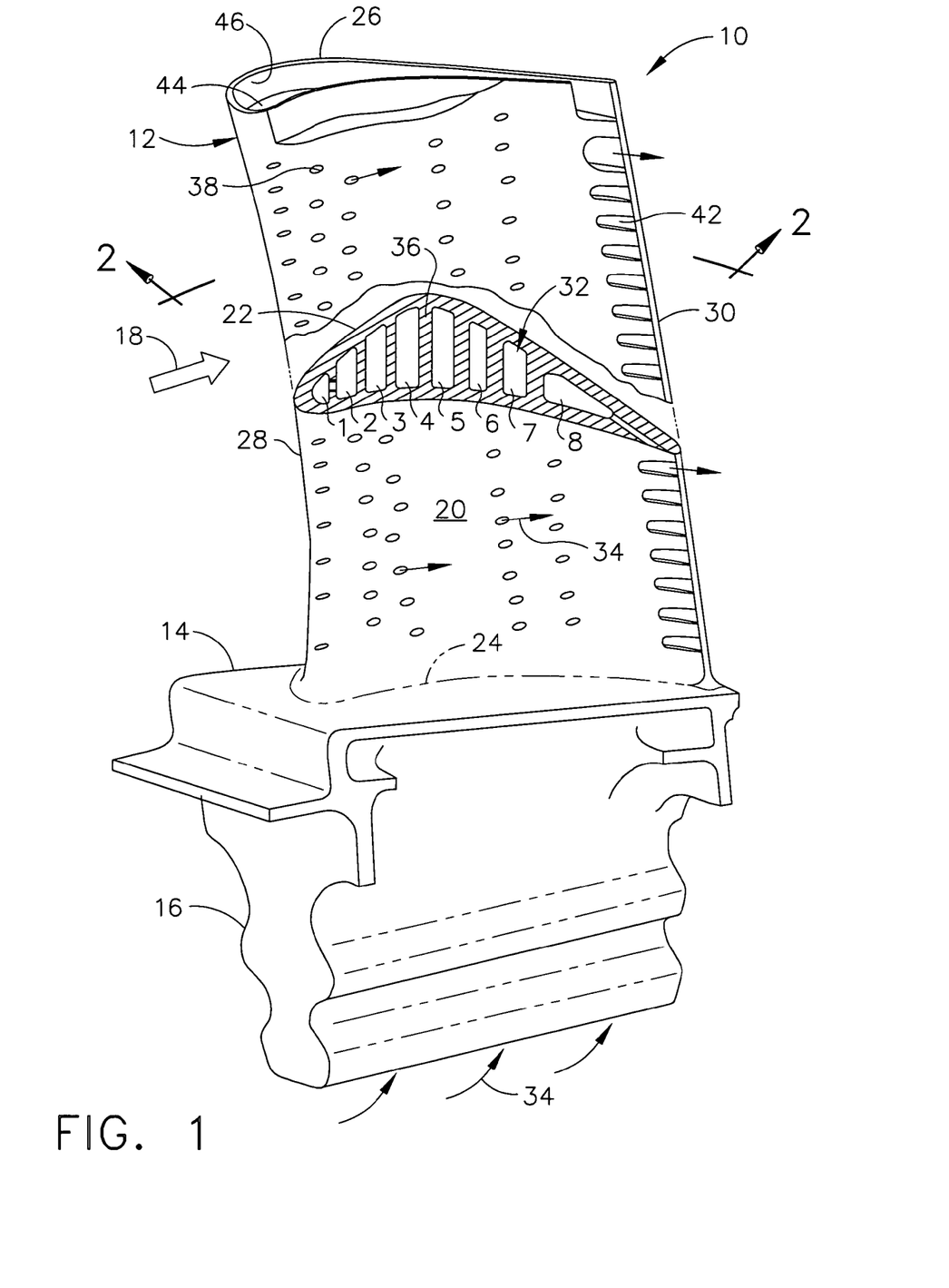
FIG. 1 is an isometric view of an exemplary turbine rotor blade for the first stage in an HPT of a gas turbine engine.

Illustrated in FIG. 1 is an exemplary turbine rotor blade 10 configured for use in the first stage of an HPT for a gas turbine engine. The blade includes an airfoil 12, platform 14, and dovetail 16 integrally joined together typically in a one-piece casting of superalloy metal for use in the hostile environment of the gas turbine engine.

The airfoil 12 is specifically configured for extracting energy from the hot combustion gases 18 generated in the combustor (not shown) of the engine during operation. The platform 14 defines the radially inner boundary for the combustion gases in the engine. And, the dovetail 16 is configured with suitable tangs or lobes for mounting the entire blade in a corresponding dovetail slot found in the perimeter of a supporting turbine rotor disk (not shown).

Figure 2:
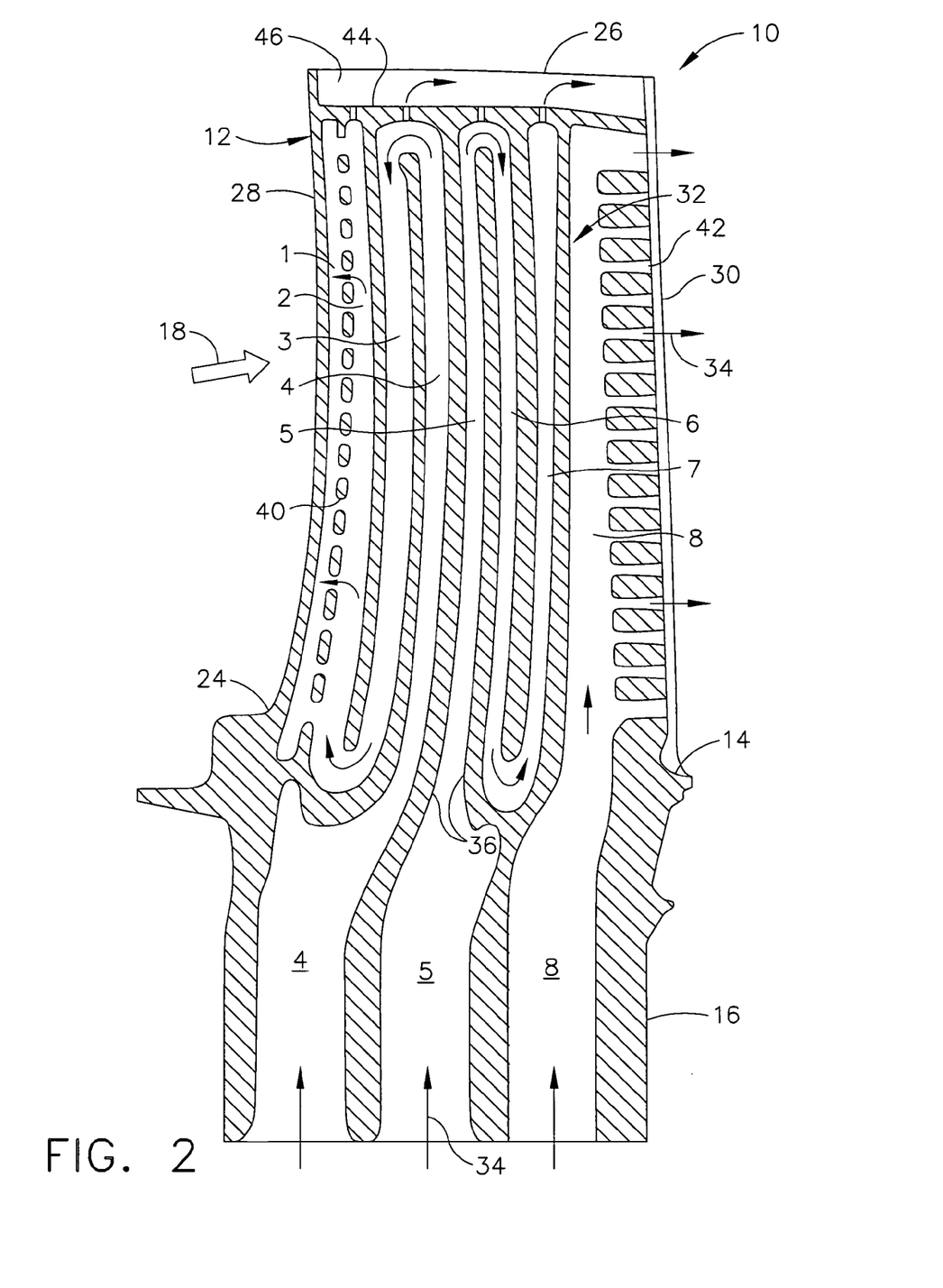
FIG. 2 is an elevational, cross sectional view of the turbine blade illustrated in FIG. 1 and taken generally along line 2-2.

The airfoil 12 illustrated in FIGS. 1 and 2 is hollow and includes circumferentially or transversely opposite pressure and suction sidewalls 20,22 extending radially or longitudinally in span from a bottom root 24 integrally joined to the platform 14, to a radially outer tip 26 closely surrounded in the engine by a corresponding turbine shroud (not shown).

The pressure sidewall 20 is generally concave and the suction sidewall 22 is generally convex, and both extend axially or laterally in chord between opposite leading and trailing edges 28,30.

The hollow airfoil 12 includes an internal cooling circuit 32 through which is circulated during operation pressurized cooling air 34 bled from the compressor (not shown) of the engine during operation and channeled to the individual turbine blades through corresponding inlets at the base of the dovetail 16 thereof.

The basic turbine blade 10 and cooling circuit 32 therein may have any conventional configuration and operation for extracting energy from the hot combustion gases 18 during operation in a high pressure turbine while circulating the cooling air 34 inside the blade for cooling thereof.

For example, the exemplary cooling circuit 32 illustrated in FIGS. 1 and 2 has a plurality of longitudinal or radial flow cavities or passages 1-8 extending in span from the root 24 to the tip 26. The fourth passage 4 further extends inwardly through the platform 14 and dovetail 16 to a corresponding inlet at the base of the dovetail. The fifth passage 5 similarly extends inwardly to the base of the dovetail to define a second inlet. And, the eighth passage 8 also extends to the base of the dovetail to define a third inlet. The three inlets receive corresponding portions of the cooling air 34 during operation for circulation in the several cooling passages 1-8.

The cooling circuit 32 and its radial passages is defined between a plurality of corresponding ribs or partitions 36 integrally joined or cast to the opposite pressure and suction sidewalls 20,22. The partitions are separated or spaced chordally apart in the axial direction of the engine to define with corresponding portions of the two sidewalls the perimeter or boundaries of the individual flow channels which vary in sectional configuration as illustrated in FIG. 1.

The first passage 1 is located directly behind the leading edge and is relatively small in sectional flow area. The passages 2-4 increase in width in the downstream direction as the width of the airfoil increases, and passages 4-8 decrease in width as the airfoil tapers in thickness to the sharp trailing edge 30.

As indicated above, the cooling circuit 32 may have any conventional configuration, and typically also includes various rows of film cooling holes 38 inclined through the pressure and suction sidewalls of the airfoil as illustrated in FIG. 1. Impingement holes 40 typically extend axially in the second partition for impingement cooling the backside of the leading edge. And, a row of trailing edge holes of slots 42 discharge cooling air through the thin airfoil trailing edge.

The film cooling holes and impingement holes are typically relatively small for controlling and metering discharge of the cooling air therethrough. The nominal diameters of these holes may be about 10-15 mils (0.25-0.38 mm) for example. In this way, the distribution of the limited cooling air received through the inlets of the cooling circuit in the dovetail base may be precisely distributed through each of the exemplary eight passages and precisely distributed from the corresponding discharge holes through the airfoil itself.

Another conventional feature in the exemplary airfoil illustrated in FIGS. 1 and 2 is the relatively thin tip cap 44 which transversely bridges the opposite sidewalls 20,22 at the airfoil tip 26 to provide the outer boundary for the internal cooling circuit 32. The tip cap 44 is typically recessed radially inwardly from the airfoil tip 26 itself to define an exposed exterior tip cavity or well 46 facing longitudinally outwardly from the outer surface of the tip cap 44. The airfoil tip 26 is defined by small integral extensions of the corresponding sidewalls which define a squealer tip or rib that laterally bounds the tip well 46 and provides sacrificial material for the occasional rubbing of the airfoil tip with the surrounding turbine shroud during operation.

Figure 3:
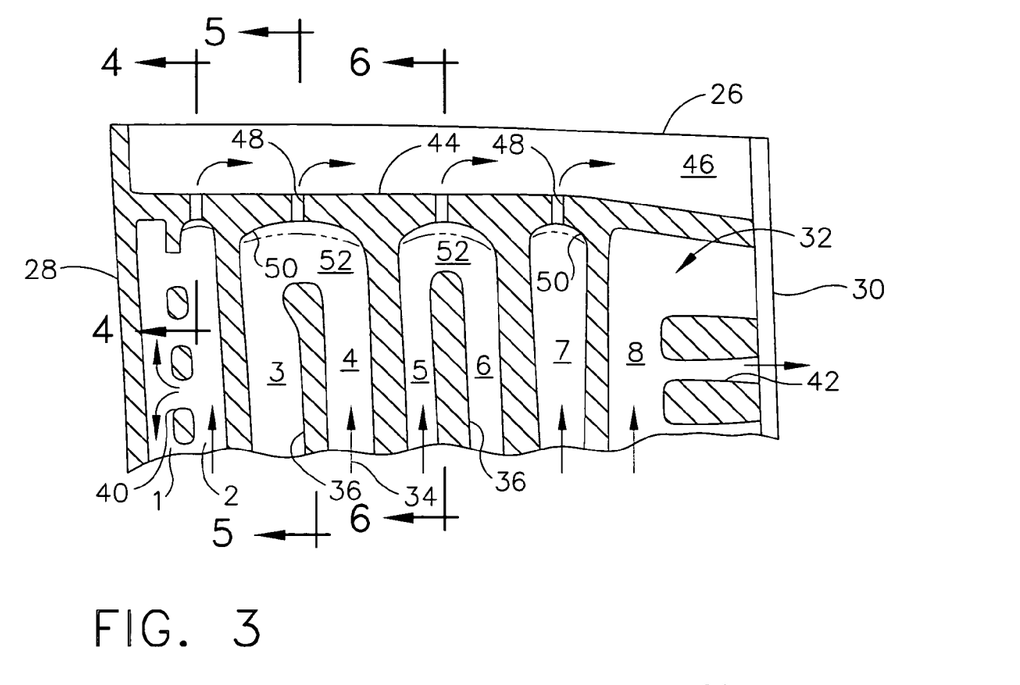
FIG. 3 is an enlarged radial sectional view of the tip region of the airfoil illustrated in FIG. 2 showing various forms of internal domes and cooperating dust holes.

The otherwise conventional turbine rotor blade illustrated in FIG. 2 is modified in the tip region thereof as shown in an enlarged view in FIG. 3 to include a cooperating dust discharge hole 48 and an internal ceiling dome or funnel 50 disposed in flow communication with a corresponding portion of the internal cooling circuit 32 to efficiently discharge dust entrained in the cooling air 34 during operation and reduce or eliminate the internal accumulation thereof along the inner surface of the tip cap 44.

The individual dust hole 48 is relatively big and is typically about twice the flow diameter of the film cooling holes 38 illustrated in FIG. 1. For example, the dust hole 48 is typically a cylindrical or tubular hole from its inlet inside the airfoil to its outlet inside the tip well with a flow diameter of about 20-30 mils (0.5-0.76 mm). In this way, the large dust hole itself does not present any additional obstruction for the accumulation of dust particles therein.

Figure 4:
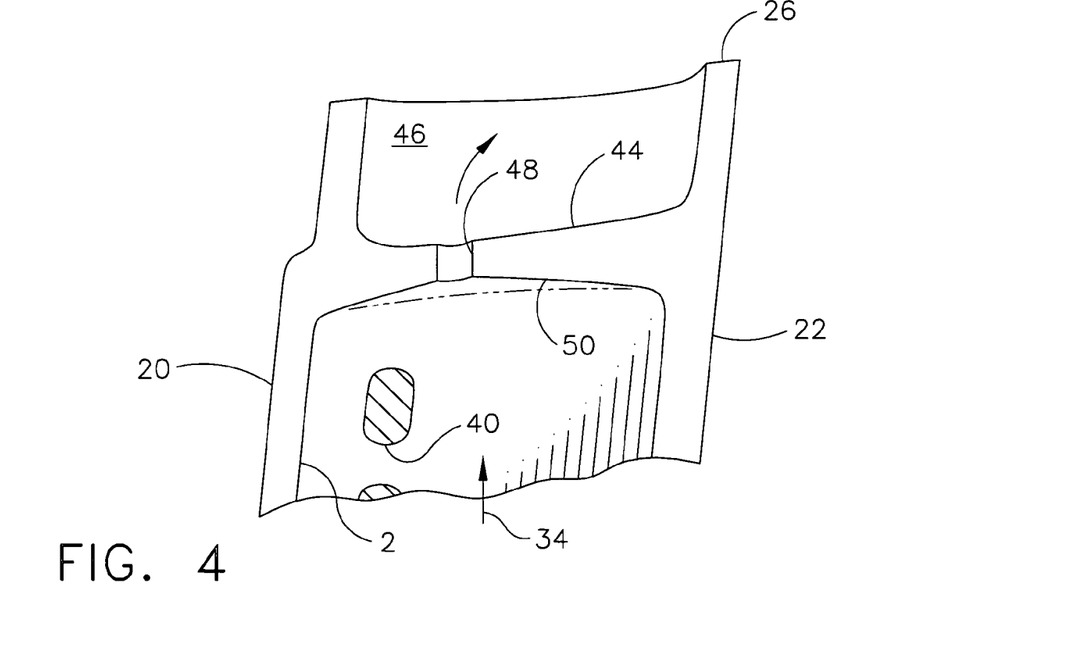
FIG. 4 is a radial sectional view through the airfoil tip illustrated in FIG. 3 and taken along line 4-4.
Figure 5:
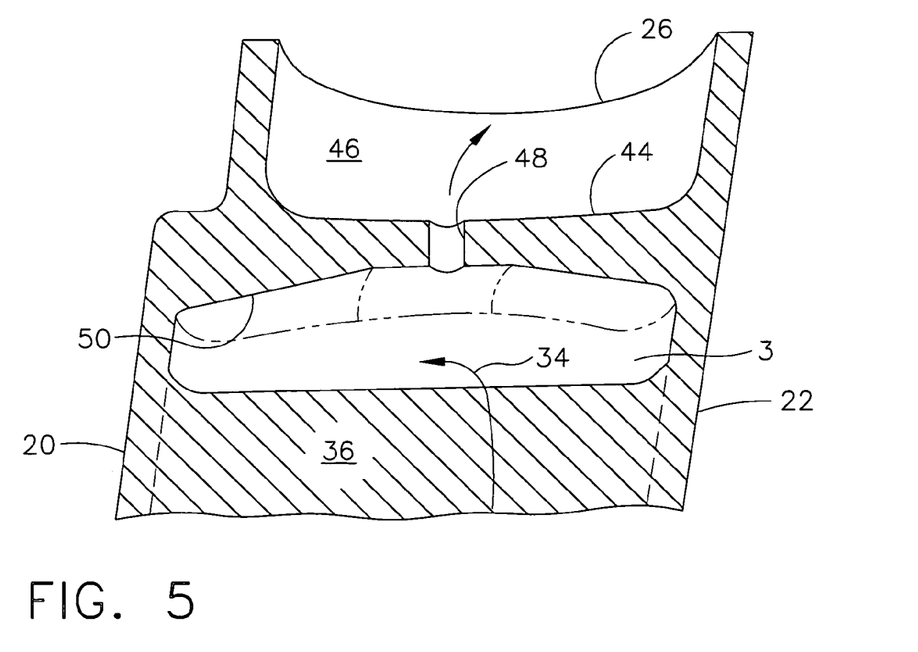
FIG. 5 is a radial sectional view through the airfoil tip illustrated in FIG. 3 and taken along line 5-5.
Figure 6:
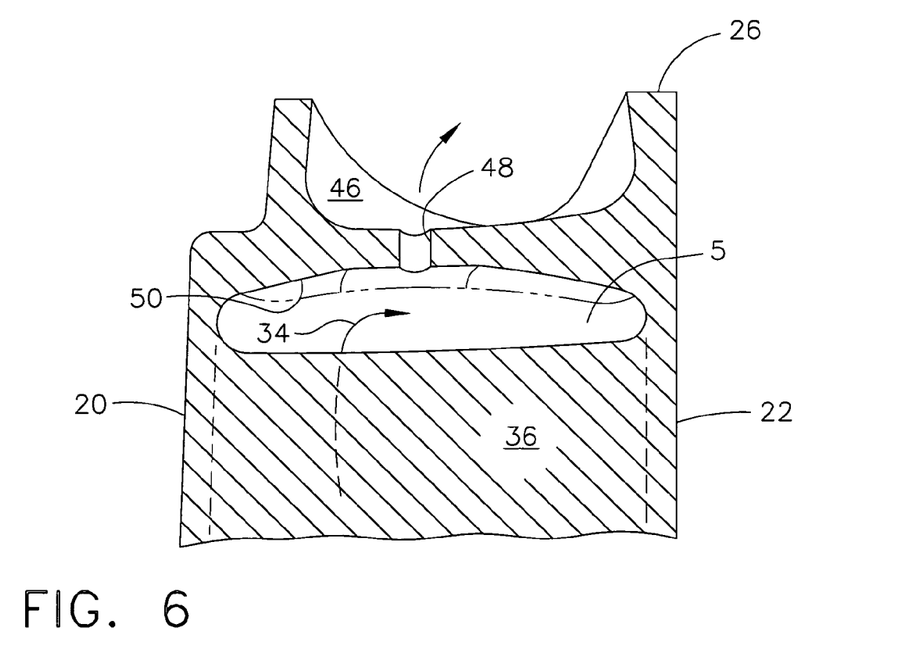
FIG. 6 a radial sectional view through the airfoil tip illustrated in FIG. 3 and taken along line 6-6.

FIGS. 4-6 illustrate three forms of the internal ceiling domes 50 which bound corresponding flow passages of the internal cooling circuit, along with the cooperating dust holes 48 therewith. Furthermore, the seventh passage 7 shown in FIG. 3 may also include a corresponding dust hole 48 and cooperating internal dome 50 similar to those found at the distal end of the second passage 2 illustrated in FIGS. 3 and 4.

Since the tip cap 44 illustrated in FIG. 3 is relatively thin to reduce weight of the turbine blade it typically is cast in conventional blades with relatively flat external and internal surfaces. The inner surface typically joins the airfoil sidewalls and the corresponding partitions at relatively small fillets, and therefore provide local stagnation regions and horizontal ledges or lands that promote dust accumulation in certain operating environments.

Accordingly, the inner surface of the tip cap 44 illustrated in FIG. 3 is selectively modified to include the generally concave ceiling domes 50 over the corresponding flow passage to eliminate horizontal lands or ledges upon which dust may accumulate, while also funneling entrained dust smoothly to the corresponding dust holes 48 for elimination from the airfoil.

Each internal dome 50 completely surrounds the corresponding dust hole 48 and is inclined longitudinal or radially inwardly from the dust hole toward the airfoil root both transversely between the opposite sidewalls 20,22 and chordally between the opposite leading and trailing edges 28,30 in a 3-D dome configuration. FIG. 3 illustrates the exemplary configuration along the airfoil chord, with FIGS. 4-6 illustrating the transverse dome configuration between the opposite sidewalls.

The several domes 50 illustrated in FIGS. 3-6 are generally concave inwardly and decrease in elevation or span relative to the airfoil root laterally outwardly from the central dust hole 48 therein toward the transversely opposite pressure and suction sidewalls 20,22 as well as the chordally opposite leading and trailing edges and the corresponding partitions bounding the individual flow passages.

Accordingly, each dome 50 has a perimeter defined by the opposite sidewalls and the bounding partitions of the flow passage and increases in elevation from the perimeter to the inboard or central maximum peak of the dome in which the dust hole 48 is disposed in the collective form of an inverted funnel. In this way, as the cooling air is channeled through the various flow passages by the pressure driving force thereof, as well as by centrifugal force due to rotation of the blades themselves, the entrained dust is forced radially outwardly through the dome funnels 50 for discharge through the central dust holes thereof with minimal, if any, dust accumulation.

Each dust funneling dome 50 is therefore relatively large compared to its discharge dust hole 48 and is coextensive in size, perimeter, and area with one or more of the radial flow passages bound thereby. Each dome is therefore relatively large and conforms with the opposite sidewalls and opposite partitions which bound the flow passages. The surface area of each dome 50, including its central dust hole 48, is therefore equal to the entire flow area of the underlying one or more flow passages bound by the corresponding dome.

Each dome is suitably inclined inwardly to smoothly blend with the sidewalls and partitions and eliminate any horizontal ledges or lands at these junctions remote from the central dust hole to prevent or reduce dust accumulation thereat.

The curvature or inclination of the individual domes in the transverse and chordal directions may be selected in accordance with the specific size and configuration of the flow passages themselves. For example, the transverse inclination of the domes 50 in the three embodiments illustrated in FIGS. 4-6 is generally similar with generally straight inclination from the dust holes to the bounding sidewalls and partitions which have relatively small blending fillets that.

For the chordal inclination or configuration of the domes illustrated in FIG. 3, the corresponding domes for passages 3,4 and passages 5,6 are generally similar with relatively straight inclination from the dust holes to relatively small fillets at the bounding partitions.

The chordal configuration of the domes for the relatively narrow passages 2,7 may be arcuate or semi-circular. And, although four domes are illustrated in the exemplary embodiments illustrated in FIG. 3, any one or more thereof may be used depending upon the specific blade design and need for additional dust resistance thereof.

It is noted in FIGS. 3-6 that the internal domes 50 are formed by locally increasing the thickness of the otherwise thin tip cap 44 outwardly from the central dust holes to their junctions with the sidewalls and partitions. This additional thickness may be readily cast in a conventional manner but correspondingly increases the weight of the turbine blade and the corresponding centrifugal load which must be carried by the turbine rotor disk during operation. The internal domes 50 should therefore be introduced in relatively large flow passages which will benefit more from the enhanced dust elimination therefrom, despite the weight increase.

Since the internal domes 50 are generally concave inwardly and bound the radially outer distal ends of corresponding flow passages where desired, they may have various configurations depending upon the specific configuration and curvature of the individual turbine blade as initially illustrated in FIG. 1, and the corresponding number and configuration of the radial flow passages of the internal cooling circuit. FIG. 1 illustrates eight exemplary flow passages 1-8, but in other turbine blade designs a fewer or greater number of flow passages may be used, which in turn determines the specific configuration of the most efficient internal dome.

FIG. 3 illustrates several configurations in which the dust holes 48 for the second and seventh passages 2,7 are aligned radially or longitudinally with those passages, respectively. In contrast, the dust holes 48 for passages 3-6 are not aligned radially or longitudinally with any of those four flow passages.

Correspondingly, the dust holes 48 may be centered directly above the corresponding second and seventh passages 2,7 as illustrated in FIG. 3, or not centered above the corresponding passages 3-6.

Since the individual domes 50 have three dimensional internal surfaces, they may enjoy the benefits of different curvature or configuration in at least the transverse direction between the opposite sidewalls and the axial or chordal direction between the partitions, as well as at any section around the 360 degree circumference thereof. For example, the dust holes 48 for the second and seventh passages 2,7 illustrated in FIG. 3 may be aligned or centered in chord above those passages, respectively.

Figure 7:
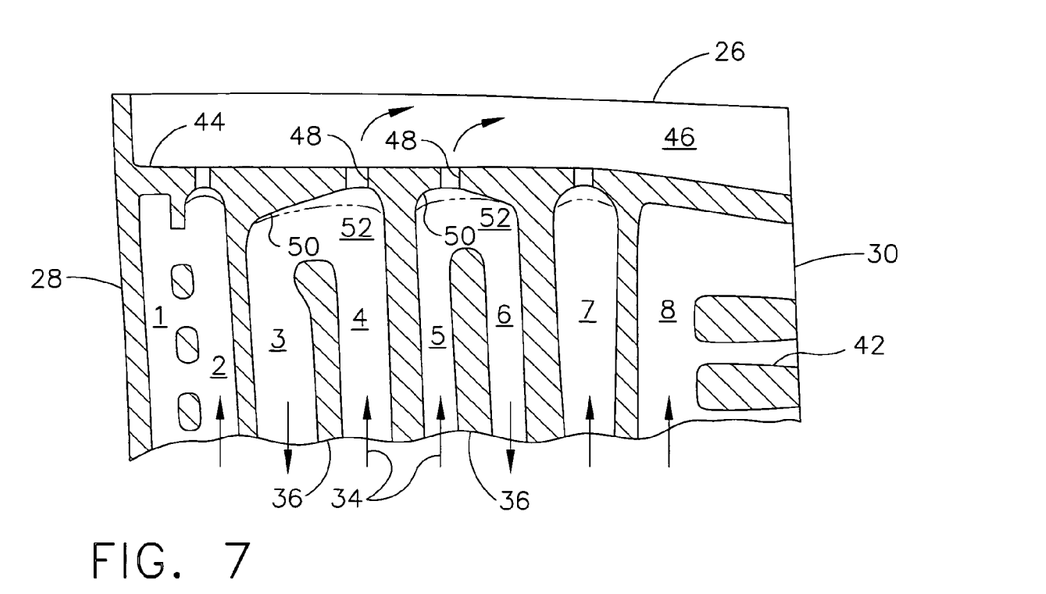
FIG. 7 is an enlarged radial sectional view, like FIG. 3, of the airfoil in accordance with another embodiment.
Figure 8:
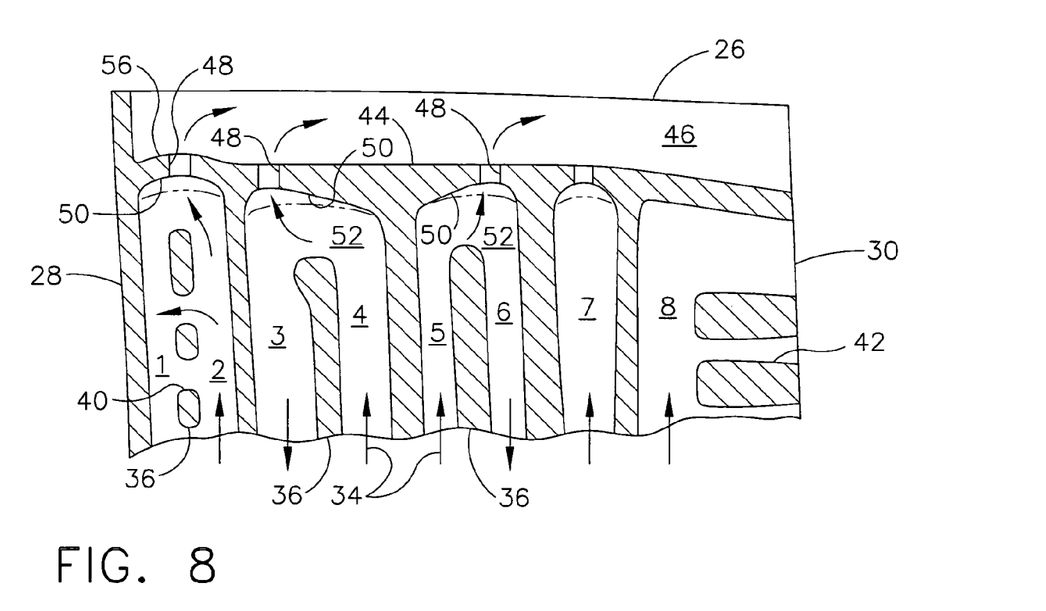
FIG. 8 is an enlarged radial sectional view, like FIG. 3, of the airfoil in accordance with another embodiment.

Correspondingly, the dust holes 48 may be offset in chord above the four passages 3-6 illustrated in the FIG. 3 embodiment, as well as in additional embodiments thereof illustrated in FIGS. 7 and 8.

Furthermore, the individual dust holes 48 may also be centered transversely between the opposite pressure and suction sidewalls above any one passage, such as the third passage 3 illustrated in FIG. 5.

Figures 9, 10, 11:
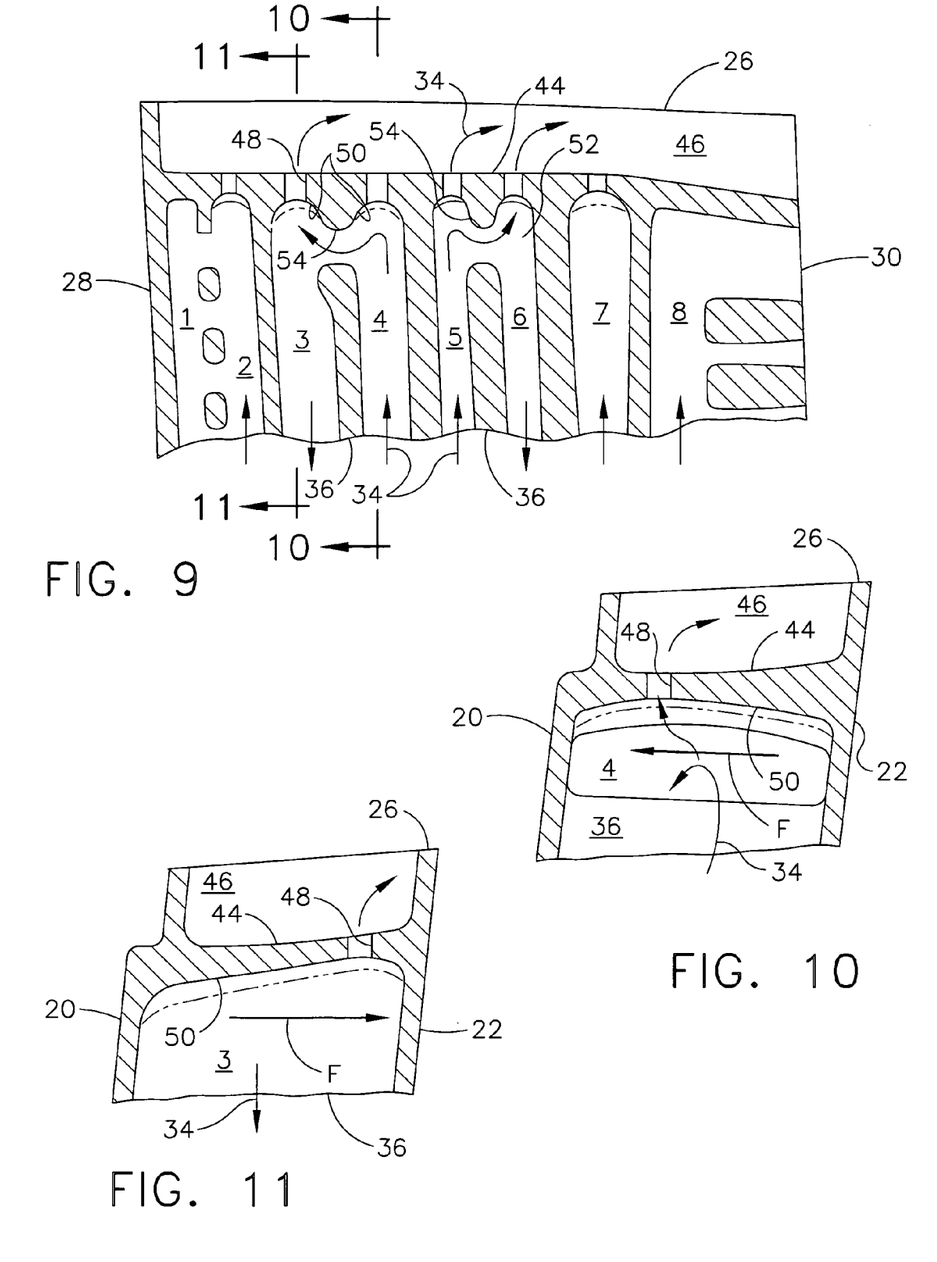
FIG. 9 is an enlarged radial sectional view, like FIG. 3, of the airfoil in accordance with another embodiment.
FIG. 10 is a radial sectional view through the airfoil tip illustrated in FIG. 9 and taken along line 10-10.
FIG. 11 is a radial sectional view through the airfoil tip illustrated in FIG. 9 and taken along line 11-11.

Alternatively, the dust holes 48 may be offset transversely between the pressure and suction sidewalls above any one passage, such as passage 2 illustrated in FIG. 4, passage 5 illustrated in FIG. 6, and passages 4 and 3 illustrated in FIGS. 10 and 11 in additional embodiments.

These different configurations of the internal domes and cooperating dust holes enjoy different advantages due to the different configurations of the individual flow passages and the centrifugal environment in which they operate.

For example, the first and second passages 1,2 illustrated in FIGS. 1 and 2 are relatively narrow and are configured for providing impingement cooling of the back side of the leading edge. The three passages 2-4 define a three-pass serpentine circuit with passage 4 extending through the dovetail for providing a first inlet to channel the cooling air axially forwardly toward the blade leading edge.

Passages 5-7 define another three-pass serpentine circuit, with passage 5 defining a second inlet through the dovetail 16 for channeling the cooling air aft toward the trailing edge. And, the eighth passage 8 provides dedicated cooling of the trailing edge through the trailing edge slots 42 fed by a third inlet through the dovetail 16.

The individual passages 1-7 illustrated in FIG. 1 are relatively narrow in width along the chord direction while increasing in transverse width as the thickness of the airfoil increases to it maximum in the hump region between the pressure and suction sidewalls.

The two serpentine circuits 4-3-2 and 5-6-7 illustrated in FIG. 3 include corresponding radially outbound inlet passages 4,5 followed in turn by radially inbound passages 3,6 and again followed in turn by corresponding outbound and last passages 2,7.

As shown initially in FIG. 3, the outbound inlet passage 4 joins the next inbound passage 3 through an outer flow turn or bend 52 defined by a truncated or shorter partition 36 that terminates short of the inner surface of the tip cap 44 and the corresponding internal dome 50. Similarly, the outbound inlet passage 5 joins the next inbound passage 6 at another outer flow bend 52 defined by the correspondingly truncated partition 36.

And, FIG. 2 illustrates that the partitions between the second and third passages 2,3 and between the sixth and seventh passages 6,7 are truncated at their radially inner ends to define corresponding inner flow bends between the last two passages of the two three-pass serpentine circuits.

Accordingly, for the two forms of the serpentine passages 4-3-2 and 5-6-7 illustrated in FIG. 3, a respective common internal dome 50 bridges the first two passages 4-3 and 5-6 of the two serpentine circuits, with the corresponding dust holes 48 being disposed in flow communication with the corresponding flow bends 52.

A single internal dome 50 may therefore bridge each of the two flow bends 52, with the single dust hole 48 in each circuit being longitudinally aligned at generally the same chord position with the truncated partition 36 between the first two passages of each serpentine circuit. Correspondingly, the common dome 50 decreases in elevation or span in a generally symmetrical manner along the chord over both the outbound and inbound flow passages 4-3 and 5-6 of the two serpentine circuits.

In this configuration, the outbound air in the outbound inlet passages 4,5 smoothly transitions along the corresponding internal domes 50 for discharging entrained dust through the dust holes 48 at the dome peaks. Lightweight dust may smoothly continue through the next inbound passage for elimination through the next outbound passage.

The weight or density of the dust is a significant factor in the detailed design of the individual domes and the placement of the corresponding dust holes therein. The cooling air channeled through each turbine blade is pressurized in the compressor and is driven through the individual airfoils at corresponding flowrates due to the differential pressure inside and outside the airfoils.

Furthermore, the individual turbine blades rotate during operation and are subject to centrifugal force which acts on the entrained dust particles in the air.

If the centrifugal load acting on the dust is greater than the aerodynamic or pressure load driving the dust then the dust will be driven by the centrifugal force to the underside of the tip cap.

However, if the aerodynamic load acting on the dust is greater than the centrifugal load, the dust will continue to be entrained in the airflow and will be carried through inbound flow passages in the airfoil.

Accordingly, the 3-D configuration of the individual domes and relative placement of the dust holes 48 inboard or centrally therein may be optimized with the specific configuration of the flow passages and the various driving forces acting on the dust of various size.

FIG. 3 illustrates the chordally central location of the dust holes in the two common domes 50 bridging the first two passages of the two serpentine circuits.

FIG. 7 illustrates a local modification of the FIG. 3 embodiment in which the dust hole 48 is longitudinally aligned or chordally centered over the outbound inlet passages 4 and 5 of the two serpentine circuits. Correspondingly, the domes 50 are asymmetrical or skewed and inclined over the truncated partition 36 and the second inbound passages 3 and 6, respectively, of the two serpentine passages.

In this way, the tip cap and corresponding domes 50 are relatively thick and imperforate over the second inbound passages 3 and 6 and relatively thin over the inlet passages 4 and 5. The entrained dust may therefore be immediately eliminated through the corresponding dust holes 48, with the inclined domes resisting further entrainment of the dust as it flows into the next inbound passages.

FIG. 8 illustrates an opposite modification of the FIG. 7 embodiment wherein the corresponding dust holes 48 are longitudinally aligned and chordally centered over the corresponding second or inbound passages 3,6 of the two serpentine circuits. The corresponding domes 50 are again asymmetrical but opposite to those illustrated in FIG. 7, and are inclined inwardly over the truncated partitions 36 and the corresponding outbound inlet passages 4,5. The tip cap 44 and internal domes are correspondingly relatively thin at the second inbound passages 3,6 while being relatively thick over the outbound inlet passages 4,5 of the two serpentine circuits.

In this way, the internal domes are imperforate over the inlet passages 4,5 and smoothly increase in elevation to the next inbound passages 3,6 above which are located the corresponding dust holes 48 that eliminate the dust during operation.

FIG. 9 illustrates yet another embodiment of the domes over the two serpentine circuits in which the tip cap 44 includes an integral dam or ridge 54 extending radially inwardly between the opposite sidewalls and suspended and spaced above the truncated partition 36 for each of the two serpentine circuits.

The two ridges 54 are aligned generally in chord with the corresponding truncated partitions in the middle of the flow bends 52 to define a double-dome configuration with a first internal dome 50 disposed above the corresponding outbound inlet passages 4 and 5, and a second internal dome 50 disposed above the corresponding next inbound passages 3 and 6. Each of the two domes 50 is generally concave inwardly and has a corresponding single dust hole 48 centrally located therein.

Each ridge 54 is preferably convex radially inwardly along the chord, and the first and second domes 50 are preferably concave inwardly and generally symmetrical in chord on opposite forward and aft sides of the common ridge 54 therebetween.

Although the double-dome configuration with the corresponding two large dust holes 48 found above the two inlet passages 3,4 and 5,6 of the two serpentine circuits correspondingly increases the flow requirements therefor, they provide an additional mechanism to increase the elimination of entrained dust in the corresponding outer flow bends 52 of the two circuits.

Recognizing the aerodynamic or inertial force and the centrifugal force acting on the entrained dust described above, the introduction of the ridge 54 can locally reduce the velocity of the air to improve dust extraction in the twin dust holes.

Yet another force acting on the entrained dust inside the turbine blade is the Coriolis force resulting from the radial flow of the cooling air in the corresponding outbound and inbound flow passages which themselves rotate with the blade during operation. The Coriolis force is conventional and is represented by the vector cross product of the airflow radial vector in the outbound and inbound passages and the rotating transverse vector of the blade itself. Accordingly, the Coriolis force is directional on the entrained dust.

FIGS. 10 and 11 illustrate schematically by dashed lines the different directions of the Coriolis force F in the outbound flow passage 4 of FIG. 10 and the inbound flow passage 3 of FIG. 11. The Coriolis force creates a secondary flow field in the cooling air perpendicular to the radial direction of the airfoil. And, the Coriolis force is necessarily combined with the aerodynamic and centrifugal forces also acting on the dust as described above.

In the outbound passage 4 illustrated in FIG. 10, the air and dust are carried radially outwardly, whereas in the inbound passage 3 illustrated in FIG. 11 the air and dust are carried radially inwardly.

Accordingly, the dust hole 48 illustrated in FIG. 10 is preferably offset transversely closer to the pressure sidewall 20 than to the suction sidewall 22 for the internal dome 50 bounding the outbound flow passage 4 to complement the direction of the Coriolis force F and improve dust elimination from the hole. Since the outbound flow passage 5 is similar to the outbound flow passage 4, the corresponding dome and location of the dust hole 48 may be similar to those shown in FIGS. 9 and 10.

Conversely, the dust hole 48 in the internal dome 50 disposed over the inbound flow passage 3 illustrated in FIG. 11 is preferably offset transversely closer to the suction sidewall 22 than to the pressure sidewall 20 to complement the opposite direction of the Coriolis force F in this passage and promote elimination of entrained dust particles through the offset dust hole 48. Since the inbound passage 6 of the second serpentine circuit corresponds with the inbound passage 3 illustrated in FIGS. 9 and 11, the configuration of the dome and dust hole 48 over passage 6 may be identical to that illustrated in FIG. 11.

FIG. 8 illustrates yet another embodiment in which the internal dome 50 may be provided in common over the first and second passages 1,2, and correspondingly complemented by an external dome 56 through which the dust hole 48 extends. In this configuration, the internal dome 50 is generally concave and the external dome 56 is generally convex for maintaining a generally constant thickness of the tip cap 44 in this region and reducing tip weight. The external dome 56 projects slightly into the exposed tip well 46.

The internal and external domes 50,56 preferably chordally bridge the two adjacent flow passages 1,2, with the common dust hole 48 being aligned with or centered chordally above the corresponding partition 36 through which the row of impingement holes 40 are found. Since the second passage 2 is the last passage of the forward serpentine circuit and also feeds the leading edge passage 1, the common dome 50 at the radially outer end thereof ensures elimination of dust entrained in this cooling flow.

The simple introduction of the internal domes 50 and cooperating dust holes 48 therein may readily eliminate any horizontal or shallow ledges or lands and flow stagnation regions where the inner surface of the tip cap joins the opposite pressure and suction sidewalls and the corresponding partitions defining the several flow passages. Dust accumulation sites are therefore eliminated, and the curvature of the internal domes may be selected for maximizing dust elimination from the differently configured flow passages, both outbound and inbound, subject to the several forces acting upon the cooling air and entrained dust during operation.

The 3-D domes 50 disclosed above may be readily manufactured in the individual turbine blades using conventional casting processes, or may be otherwise manufactured therein as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   an airfoil including opposite pressure and suction sidewalls extending longitudinally in span from root to tip and laterally in chord between leading and trailing edges;
   said sidewalls being transversely spaced apart to define an internal cooling circuit having a plurality of longitudinal flow passages separated in chord by corresponding partitions;
   said airfoil further includes a tip cap recessed inwardly from said airfoil tip to define an exposed tip well, and having an internal dome surrounding a dust hole extending in flow communication from said cooling circuit to said well; and
   said dome is inclined inwardly both transversely between said sidewalls and chordally between said leading and trailing edges, and is coextensive with at least one of said passages.

2. A blade according to claim 1 wherein said dome increases in elevation from a perimeter thereof at said sidewalls to an inboard peak containing said dust hole therein.

3. A blade according to claim 2 wherein said dust hole is centered in chord above one of said passages.

4. A blade according to claim 2 wherein said dust hole is centered transversely above one of said passages.

5. A blade according to claim 2 wherein said dust hole is offset in chord above one of said passages.

6. A blade according to claim 2 wherein said dust hole is offset transversely above one of said passages.

7. A blade according to claim 2 wherein said cooling circuit includes an outbound flow passage, and said dust hole is offset transversely closer to said pressure sidewall than to said suction sidewall.

8. A blade according to claim 2 wherein said cooling circuit includes an inbound flow passages, and said dust hole is offset transversely closer to said suction sidewall than to said pressure sidewall.

9. A blade according to claim 2 wherein said cooling circuit includes a plurality of outbound and inbound flow passages, arranged in a serpentine with a truncated partition therebetween defining a flow bend, a single dome bridges said flow bend, and said dust hole is disposed in flow communication with said flow bend.

10. A blade according to claim 2 wherein:
said cooling circuit includes a plurality of outbound and inbound flow passages, arranged in a serpentine with a truncated partition therebetween defining a flow bend; and
said tip cap further includes a ridge suspended above said truncated partition to define a first internal dome disposed above said outbound passage, and a second internal dome disposed above said inbound passage, and each dome has a corresponding dust hole.

11. A turbine blade comprising:
a hollow airfoil integrally joined to a platform and dovetail, and having opposite pressure and suction sidewalls extending longitudinally in span from root to tip and laterally in chord between opposite leading and trailing edges;
said airfoil further including a tip cap recessed inwardly from said tip to define an exposed tip well laterally bound by said sidewalls, and having a dust hole extending therethrough; and
said tip cap further includes an internal dome surrounding said dust hole and inclined longitudinally inwardly from said dust hole toward said root chordally between said leading and trailing edges, and increasing in elevation transversely from said sidewalls to said dust hole.

12. A blade according to claim 11 wherein said airfoil further includes an internal cooling circuit having a plurality of longitudinal flow passages extending from said root to said tip, and said dust hole is disposed in flow communication with the longitudinal outer end of one of said passages and said dome is coextensive in perimeter with said one passage.

13. A turbine blade comprising:
a hollow airfoil integrally joined to a platform and dovetail, and having opposite pressure and suction sidewalls extending longitudinally in span from root to tip and laterally in chord between opposite leading and trailing edges;
said airfoil further including a tip cap bridging said sidewalls at said tip, and having a dust hole extending therethrough;
said airfoil further includes an internal cooling circuit having a plurality of longitudinal flow passages extending from said root to said tip, and said dust hole is disposed in flow communication with the longitudinal outer end of one of said passages;
said tip cap further includes an internal dome surrounding said dust hole and inclined longitudinally inwardly toward said root both transversely between said sidewalls and chordally between said leading and trailing edges; and
wherein said dome is generally concave and decreases in elevation laterally from said dust hole toward said transversely opposite pressure and suction sidewalls and chordally opposite leading and trailing edges.

14. A blade according to claim 13 wherein said cooling circuit is defined between a plurality of partitions integrally joined to the said pressure and suction sidewalls and spaced chordally apart, and said dome is inclined inwardly to smoothly blend with said sidewalls and partitions.

15. A blade according to claim 14 wherein said dust hole is aligned longitudinally with said one passage.

16. A blade according to claim 14 wherein said dust hole is not aligned longitudinally with said one passage.

17. A blade according to claim 14 wherein said dust hole is centered above said one passage.

18. A blade according to claim 14 wherein said dust hole is not centered above said one passage.

19. A blade according to claim 14 wherein said dust hole is centered in chord above said one passage.

20. A blade according to claim 14 wherein said dust hole is offset in chord above said one passage.

21. A blade according to claim 14 wherein said dust hole is centered transversely above said one passage.

22. A blade according to claim 14 wherein said dust hole is offset transversely above said one passage.

23. A blade according to claim 14 wherein said cooling circuit includes an outbound flow passage, and said dust hole is offset transversely closer to said pressure sidewall than to said suction sidewall.

24. A blade according to claim 14 wherein said cooling circuit includes an inbound flow passages, and said dust hole is offset transversely closer to said suction sidewall than to said pressure sidewall.

25. A blade according to claim 14 wherein said cooling circuit includes a plurality of outbound and inbound flow passages, arranged in a serpentine with a truncated partition therebetween defining a flow bend, and said dust hole is disposed in flow communication with said flow bend.

26. A blade according to claim 25 wherein said dust hole is aligned with said truncated partition, and said dome decreases in elevation along said chord over both said outbound and inbound passages.

27. A blade according to claim 25 wherein said dust hole is aligned with said outbound passage, and said dome is inclined over said truncated partition and over said inbound passage.

28. A blade according to claim 25 wherein said dust hole is aligned with said inbound passage, and said dome is inclined over said truncated partition and over said outbound passage.

29. A blade according to claim 25 wherein said tip cap further includes a ridge suspended above said truncated partition to define a first internal dome disposed above said outbound passage, and a second internal dome disposed above said inbound passage, and each dome has a corresponding dust hole.

30. A blade according to claim 29 wherein said ridge is convex inwardly, and said first and second domes are concave inwardly.

31. A blade according to claim 30 wherein said dust hole in said first dome is offset transversely closer to said pressure sidewall than to said suction sidewall, and said dust hole in said second dome is offset transversely closer to said suction sidewall than to said pressure sidewall.

32. A blade according to claim 14 wherein said tip cap is recessed inwardly from said airfoil tip to define an exposed tip well facing longitudinally outwardly from said tip cap, and said internal dome is complemented by an external dome through which said dust hole extends.

33. A blade according to claim 32 wherein said internal and external domes chordally bridge two adjacent flow passages, and said dust hole is aligned with said partition therebetween.

* * * * *